US008202465B2

United States Patent
Yen et al.

(10) Patent No.: US 8,202,465 B2
(45) Date of Patent: Jun. 19, 2012

(54) PREFERENTIAL CURING TECHNIQUE IN COMPRESSION MOLDING OF FIBER REINFORCED COMPOSITES

(75) Inventors: Cheng-Lung E. Yen, Granger, IN (US); Ken S. Lukas, South Bend, IN (US)

(73) Assignee: Honeywell International Inc., Morristown, NJ (US)

( * ) Notice: Subject to any disclaimer, the term of this patent is extended or adjusted under 35 U.S.C. 154(b) by 975 days.

(21) Appl. No.: 10/980,032

(22) Filed: Nov. 3, 2004

(65) Prior Publication Data

US 2006/0091583 A1 May 4, 2006

(51) Int. Cl.
*B29C 59/02* (2006.01)
(52) U.S. Cl. ........................................ 264/320
(58) Field of Classification Search .................. 264/320, 264/29.5, 40.6, 128, 326, 327, 234, 235; 425/406, 407, 408, 394, 423
See application file for complete search history.

(56) References Cited

U.S. PATENT DOCUMENTS

| | | | |
|---|---|---|---|
| 2,509,652 A * | 5/1950 | Rushmer et al. ............ 264/430 |
| 3,933,335 A | 1/1976 | Maruyama et al. |
| 4,041,116 A * | 8/1977 | Baud et al. .................. 264/29.5 |
| 4,338,068 A | 7/1982 | Suh et al. |
| 4,568,259 A * | 2/1986 | Mattson ........................ 425/40 |
| 5,154,221 A | 10/1992 | Vatant et al. |
| 5,609,922 A | 3/1997 | McDonald |
| 5,746,966 A | 5/1998 | McDonald |
| 5,783,259 A | 7/1998 | McDonald |
| 5,811,135 A | 9/1998 | Kimura |
| 6,743,384 B2 | 6/2001 | Lukas et al. |
| 2002/0130432 A1 * | 9/2002 | Lukas et al. .............. 264/40.6 |
| 2004/0113302 A1 * | 6/2004 | La Forest et al. .......... 264/29.1 |
| 2006/0091583 A1 * | 5/2006 | Yen et al. .................. 264/219 |

FOREIGN PATENT DOCUMENTS

EP 1 366 878 A1 12/2003
WO WO-03/061931 A2 7/2003

OTHER PUBLICATIONS

Glastherm Grade S technical data sheet, Glastic Corp.*
Glastherm Grade CH technical data sheet, Glastic Corp.*

* cited by examiner

Primary Examiner — Larry Thrower
(74) Attorney, Agent, or Firm — Shumaker & Sieffert, P.A.

(57) ABSTRACT

A molding process that involves applying heat (17) to a mold billet (12) located in a mold cavity (11) defined by steel inserts (15). A layer (19) of material having a low thermal conductivity of 1-2 BTU/hour/square foot/inch/F.° at 450° F. is positioned contiguously to at least one of the inserts (15) so that a portion (13) of the mold billet (12) in the vicinity of the low thermal conductivity material layer (19) remains cooler than portions of the mold billet that are remote from the layer of material (19). Also, a mold apparatus comprising a mold cavity (11) defined by steel inserts (15) wherein each of the inserts (15) rests on a bed (19) of low thermal conductivity material which is comprised of 38-48 weight-% calcium carbonate, 27-38 weight-% polymerized unsaturated polyester resin, and 20-30 weight-% fiberglass. The mold billet (12) may be configured in the shape of an aircraft landing system brake disc preform (33).

4 Claims, 6 Drawing Sheets

PREFERENTIAL CURING TECHNIQUE IN COMPRESSION MOLDING OF FIBER REINFORCED COMPOSITES

FIELD OF THE INVENTION

The present invention is generally directed to molds and molding processes, and more particularly to a method and an apparatus for molding processes that makes use of a low thermal conductivity material member to control heating within the mold cavity.

BACKGROUND OF THE INVENTION

The processing of molded materials is a precise operation requiring the precisely timed application of pressure and the application of precise and uniform temperature. The background art includes several examples of related control schemes for regulating mold process temperatures.

For example, U.S. Pat. No. 3,933,335 describes a casting mold for casting metals that includes a paper-like sheet of carbon fibers admixed with organic fibers or pulp that is used as a liner between the molten metals within the mold and the mold's interior surface. The carbon fiber sheets include at least 35 percent by weight of carbon fibers in order to prevent undesirable stresses and seizure as a result of contact between the molten metal and the interior surface of the mold.

U.S. Pat. No. 4,388,068 describes an injection molding device and method that includes the use of a variable conductance heat pipe for controlling the rate of cooling of portions of a mold cavity surface separately and independently from other portions of the mold cavity surface. This molding device and method inherently relies upon individualized, active temperature regulation and temperature approximation of numerous sub-portions at various locations of the mold.

U.S. Pat. No. 5,154,221 describes a device for fixing and cooling a graphite block of a graphite wall of a mold. A mold cavity is formed by a plurality of vertically oriented graphite blocks that make up the mold cavity walls. The individual graphite blocks contain vertical bores arranged in parallel to the surface of the mold cavity walls. Each of the bores permits sprayed jets of cooling fluid into the interior of the blocks to effect cooling of the mold cavities.

U.S. Pat. Nos. 5,609,922; 5,746,966; and 5,783,259 all describe methods and molds for molding processes that incorporate thermal coatings applied to an interior surface of a mold cavity via the use of a thermal spray. The coatings may include ceramics, metal matrix composites, ceramic matrix composites, resins and various combinations thereof. The thermal coating is selected to impart a desired porosity into the interior surface of the mold cavity that will aid in rapid cooling and will add to the structural strength of the mold itself.

U.S. Pat. No. 5,811,135 describes a molding apparatus having a conventional molding box structure with a thermally expanding member.

U.S. Pat. No. 6,743,384 B2 provides a good overview of molding apparatuses of the sort within which the present invention may be conducted. In U.S. Pat. No. 6,743,384, FIG. 1 is a side view of a molding apparatus according to the background art. FIG. 2 is a front elevation view of a mold member for the molding apparatus of FIG. 1. FIG. 3 is an exploded perspective view of the mold member for the molding apparatus of FIG. 1. FIG. 4 is a sectional view of a molten material filling mechanism for a molding apparatus according to the background art. As seen in FIG. 1 through FIG. 4, a molding box structure 10 includes horizontally arranged support elements 11, threaded struts 12, and a plurality of nuts 13. A mold member 20 (shown in two parts, e.g., an upper half 21 and a lower half 22), a pressurizing plate 30, a thermally expanding member 40 and an auxiliary pressurizing mechanism 50 are vertically arranged between the lower two support elements 11 in this order from top to bottom. The thermally expanding member 40 includes a temperature adjusting mechanism 60. The temperature adjusting mechanism 60 is used to control the pressure that the thermally expanding member 40 imparts to the mold member 20 to sealingly engage the upper and lower halves 21,22 of the mold member. The temperature adjusting mechanism 60 also includes a cylindrical heater (not shown) for heating and expanding the thermal expansion member 40. A cooling oil circuit (not shown) is used to contract and cool the thermally expanding member 40. During a conventional molding process, the mold member 20 is accommodated between the pressurizing plate 30 and one of the support elements 11a2. The upper and lower molds 21 and 22 have concavities formed in faces opposed to each other, in predetermined configurations, respectively. Each of the molds 21 and 22 further has a plurality of positioning pins 23 for preventing lateral misalignment. The upper mold 21 has a material filling hole 21a formed therethrough to correspond to the central cylinder hole 71 formed through the support plate 11a, as shown in FIG. 4. A thrusting piston 72 is insertable into the cylinder hole 71 and is connected to a piston 73a of an oil-hydraulic cylinder mounted on and extending through a central portion of the uppermost support plate 11b. Movement of the piston 73a vertically moves the thrusting piston 72 so that molten material accommodated in the cylindrical hole 71 can fill the interior of the mold member 20 through the material filling hole 21a of the upper mold 21. Depending on the type of molding process undertaken, the finished molded product is demolded after the required cooling process or molding process is completed.

U.S. Pat. No. 6,743,384 provides a novel mold assembly for a molding process comprising a mold member and an anisotropic diffuser member, the diffuser member comprising a fibrous composite having a plurality of fibers each having a respective length, the fibers being arranged in a lay-up with the length of each fiber arranged in a substantially uniform direction within the diffuser member, wherein the diffuser member is arranged in a position permitting a rapid transfer of heat along the length of each fiber to the mold member.

SUMMARY OF THE INVENTION

The present invention avoids accelerated curing at edges in mold, so that volatiles which are generated in the mold are not trapped in the interior of the body being molded.

Compression molding of carbon fiber reinforced thermoset plastics requires precisely timed application of pressure, uniform application of heat, and efficient venting of volatiles generated during the mold cycles to produce defect-free molded objects (mold billets). The present invention facilitates the venting mechanism during the mold cycle. This invention provides heating to specific components of the mold while hindering conductive heat transfer to other components of the mold to prevent accelerated curing of certain portions of mold billets, thereby facilitating venting of the volatiles.

Thus, the present invention, in part, is a recognition that it is advantageous to control the distribution of heat within a mold die or molding cavity during a molding process, and in particular that metal portions of the mold die or molding cavity that contact the edges of a carbon-carbon composite precursor material (for instance, carbon fiber-reinforced phenolic composite material) being treated in the molding process should be prevented from transferring excessive heat to those edges.

The present invention, also in part, provides a mold assembly for a molding process comprising a mold member and a low thermal conductivity material member, wherein the low thermal conductivity material member is arranged in a position permitting the mold member to remain cooler than it would otherwise be. In this invention, the mold apparatus may include a mold cavity defined by steel inserts wherein each of the inserts rests on a bed of material which is comprised of 38-48 weight-% calcium carbonate, 27-38 weight-% polymerized unsaturated polyester resin, and 20-30 weight-% fiberglass. In accordance with this invention, the material having a thermal conductivity of 1-2 BTU/hour/square foot/inch/F.° at 450° F., that is, a "low" thermal conductivity. In a preferred aspect of this embodiment of the present invention, a mold billet in the mold cavity may be configured in the shape of an aircraft landing system brake disc preform and the bed of material may be an annular board 0.5 inches in thickness having a width approximately equal to the width of the annular brake disc preform.

The present invention, also in part, provides a method of controlling process temperatures in a molding apparatus, the method comprising the steps of controlling a temperature of a mole member with a heat source and arranging a low thermal conductivity material member along a surface of the mold member for preventing excessive heat transfer to that mold member. Thus, this invention provides a process of compression molding an annular carbon fiber-reinforced composite disc by: placing the disc in a mold cavity defined at least in part by metal members situated in positions contiguous to the interior and exterior edges of the annular disc, applying pressure to the top and bottom surfaces of the annular disc, and applying heat to the disc while decoupling thermal transfer to the interior and exterior edges of the annular disc. This permits volatile materials that are generated within the disc by the application of heat and pressure to the disc to escape through the interior and exterior edges of the annular disc. In this process, the decoupling of thermal transfer to the interior and exterior edges of the disc may be effected by a variety of techniques, including by contour heating of the metal members, by active cooling of the metal members, or by the location of insulation board between a heat source and the metal members.

A preferred embodiment of the process of this invention is an improvement in a molding process that comprises applying heat to a mold billet located in a mold cavity defined by steel inserts. The mold billet may be, for instance, a fiber-reinforced thermoset resin composite in the form of an aircraft landing system brake disc preform. The improvement contemplates positioning a layer of low thermal conductivity material in a position contiguous to at least one of the inserts so that a portion of the mold billet in the vicinity of the low thermal conductivity material layer remains cooler, e.g., at least about 5° C. cooler, than portions of the mold billet that are more remote from the layer of material. The low thermal conductivity material is made up, for instance, of 38-48 weight-% calcium carbonate, 27-38 weight-% polymerized unsaturated polyester resin, and 20-30 weight-% fiberglass. In accordance with this invention, the material has a thermal conductivity of 1-2 BTU/hour/square foot/inch/F.° at 450° F.

BRIEF DESCRIPTION OF THE DRAWINGS

The present invention will be more fully understood from the detailed description given hereinafter and from the accompanying drawings. The drawings are not to scale, and are presented for illustrative purposes only. Thus the drawings are not intended to limit the present invention.

2A is a side sectional view of a mold cavity that is not supplied with low thermal conductivity material in accordance with the present invention.

DETAILED DESCRIPTION OF THE INVENTION

The present invention will now be described in detail with reference to the drawings that accompany this application.

This invention makes use of high strength insulation materials that have low thermal conductivity. A typical material is made of calcium carbonate-filled fiberglass-reinforced plastic. One such substance is GlasTherm Grade CH, available from Glastic Corporation of Cleveland, Ohio. The thermal conductivity of the material used in the present invention is preferably in the range of 1 to 2 BTU/hour/square foot/inch/F.° at 450° F. The material is most conveniently employed in the form of board. Alternatively, however, the material could be suspended in a solvent and coated onto the desired locations in the mold. Generally, the board or coating of low thermal conductivity will have a thickness of approximately 0.5 inches. However, thinner or thicker boards or coatings can be used, depending primarily upon the size of the mold cavity and the temperatures to be employed in the molding process.

Molding apparatus that is particularly suited for use with the present invention is that disclosed in U.S. Pat. No. 6,743,384, the entire disclosure of which patent is hereby expressly incorporated by reference. The present invention applies its high strength insulation material having low thermal conductivity to areas within and near the mold cavity, such as edges, where venting of volatiles is critical. The use of such material in accordance with this invention prevents accelerated curing at the edges of the object (e.g., a carbon-carbon composite brake disc preform) being molded. In this way, volatiles generated during the curing process can be vented through the edges of the object more efficiently instead of being trapped inside the object being molded as a result of accelerated curing at its edges.

Figure 1:
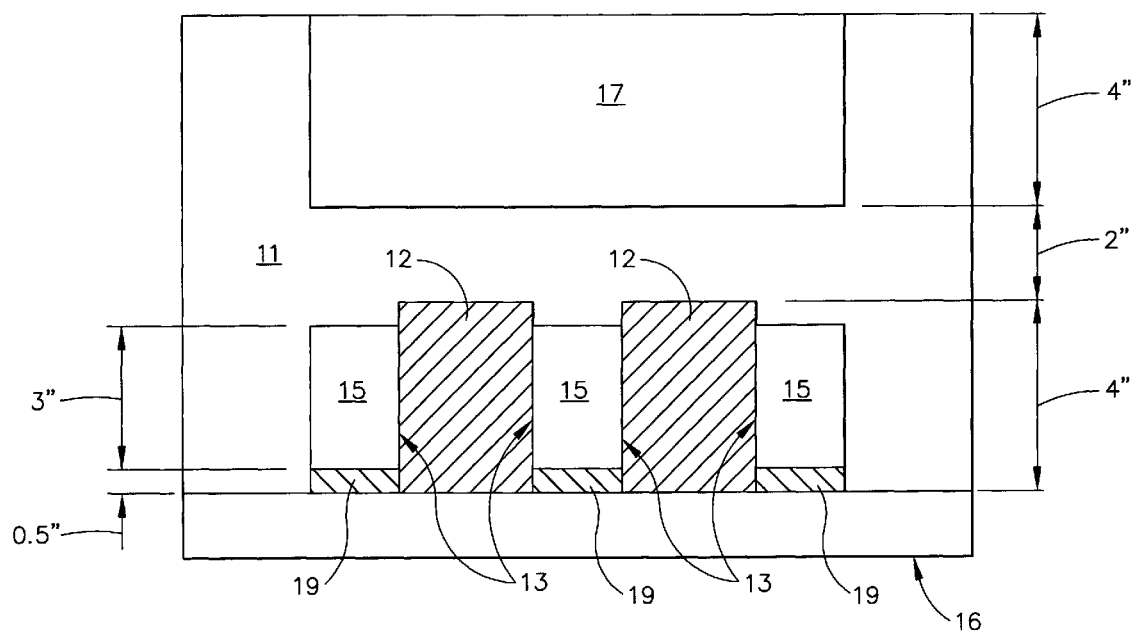
FIG. 1 is a side sectional view of a mold cavity containing a thermal insulation board in accordance with the present invention.

In current mold design, heat is applied to all surfaces of the mold billet. FIG. 1 is a side sectional view of a mold cavity 11 containing a mold billet 12 which is a carbon-carbon composite (e.g., a carbon fiber reinforced phenolic resin compound). Features 16 and 17 are heat sources which supply heat to mold cavity interior 11. As those skilled in the art will realize, the dimensions indicated in FIG. 1 are illustrative only. In the absence of the low thermal conductivity material provided by the present invention, phenolic resin material in the vicinity of the heated surfaces would cure faster than phenolic resin material in the interior of the mold billet, due to its direct contact with the heated surfaces. That is because, in conventional processing, edges 13 of the mold billet normally get heated due to the heat conductivity of steel mold inserts 15. Accelerated curing at the edges 13 prevents volatiles generated in the interior of the mold billet 12 from being released efficiently during the breath cycle of the molding process. The present invention installs high strength thermal insulation board 19 under the steel mold inserts. This prevents the edges 13 of the mold billet 12 from being subjected to accelerated heating and curing, and thus facilitates the venting of volatiles during the breath cycle.

Figure 2A:
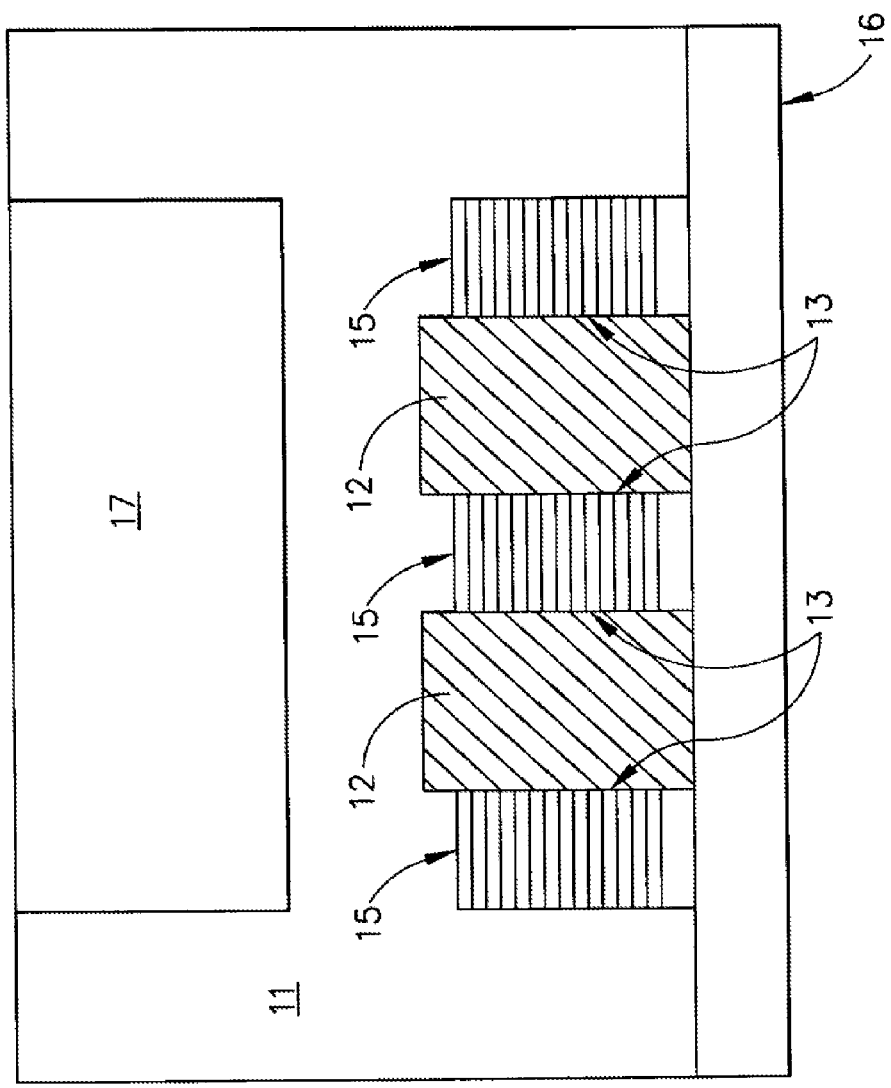
FIG. 2B is a side sectional view of a mold cavity which is supplied with low thermal conductivity material in accordance with the present invention.
Figure 2B:
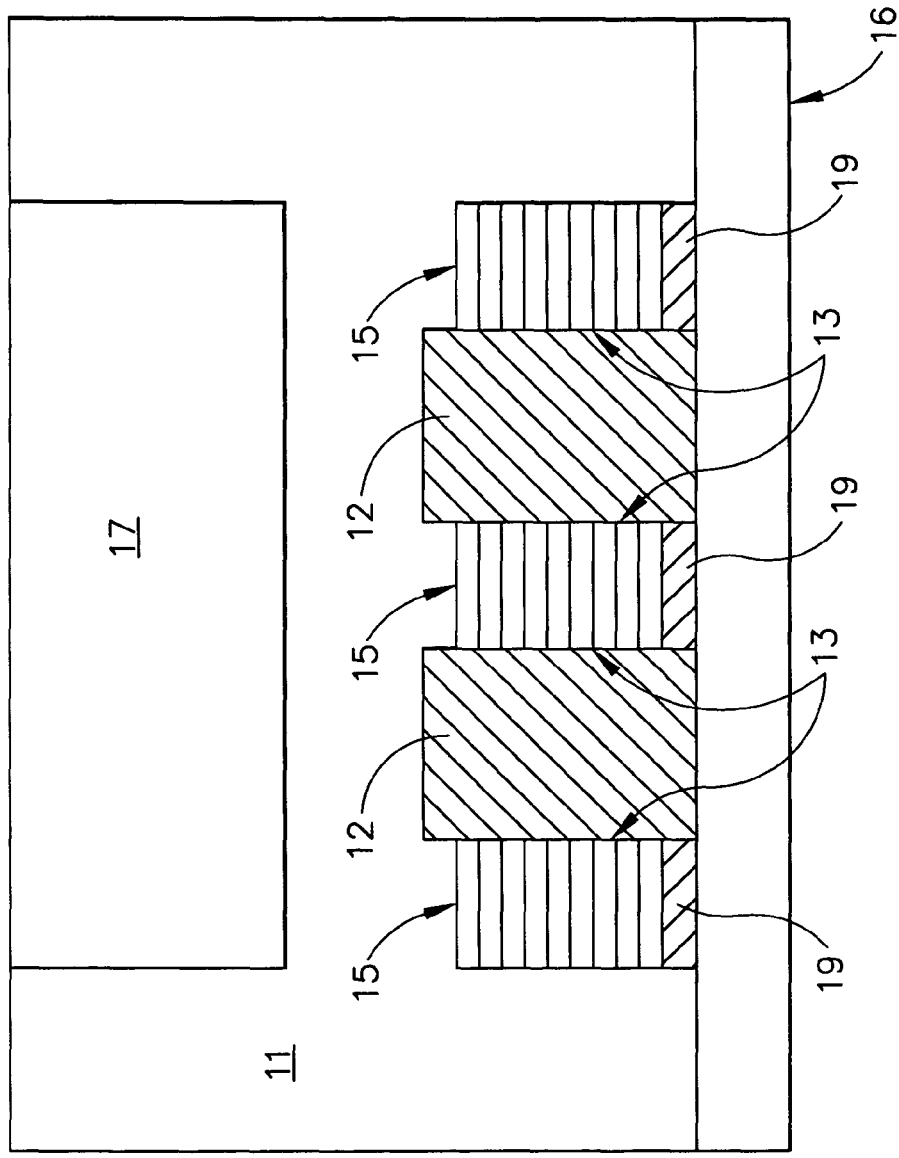

The principle of this invention may be understood by reference to FIGS. 2A and 2B. FIG. 2A illustrates a mold cavity 11 that is not supplied with low thermal conductivity material in accordance with the present invention. The relatively dense horizontal lines in steel mold inserts 15 in FIG. 2A represent the higher degree of heat present in the 2A steel mold inserts. FIG. 2B illustrates a mold cavity 11 which is supplied with low thermal conductivity material 19 in accordance with the present invention. The less dense horizontal lines in the steel mold inserts 15 in FIG. 2B represent the lower degree of heat present in the 2B steel mold inserts. Hot molding in the apparatus of FIG. 2A (not the present invention) will heat, and so cure, the edges 13 of the mold billet 12 significantly faster than will hot molding in the apparatus of FIG. 2B (representative of the present invention).

In conventional carbon composite disc mold processing, the mold insert temperatures are typically approximately 182-183° C. Carbon composite disc mold processing employing a low thermal conductivity material in accordance with the present invention results in mold insert temperatures that are typically approximately 177-178° C., roughly 5° lower than with conventional processing.

Figure 3:
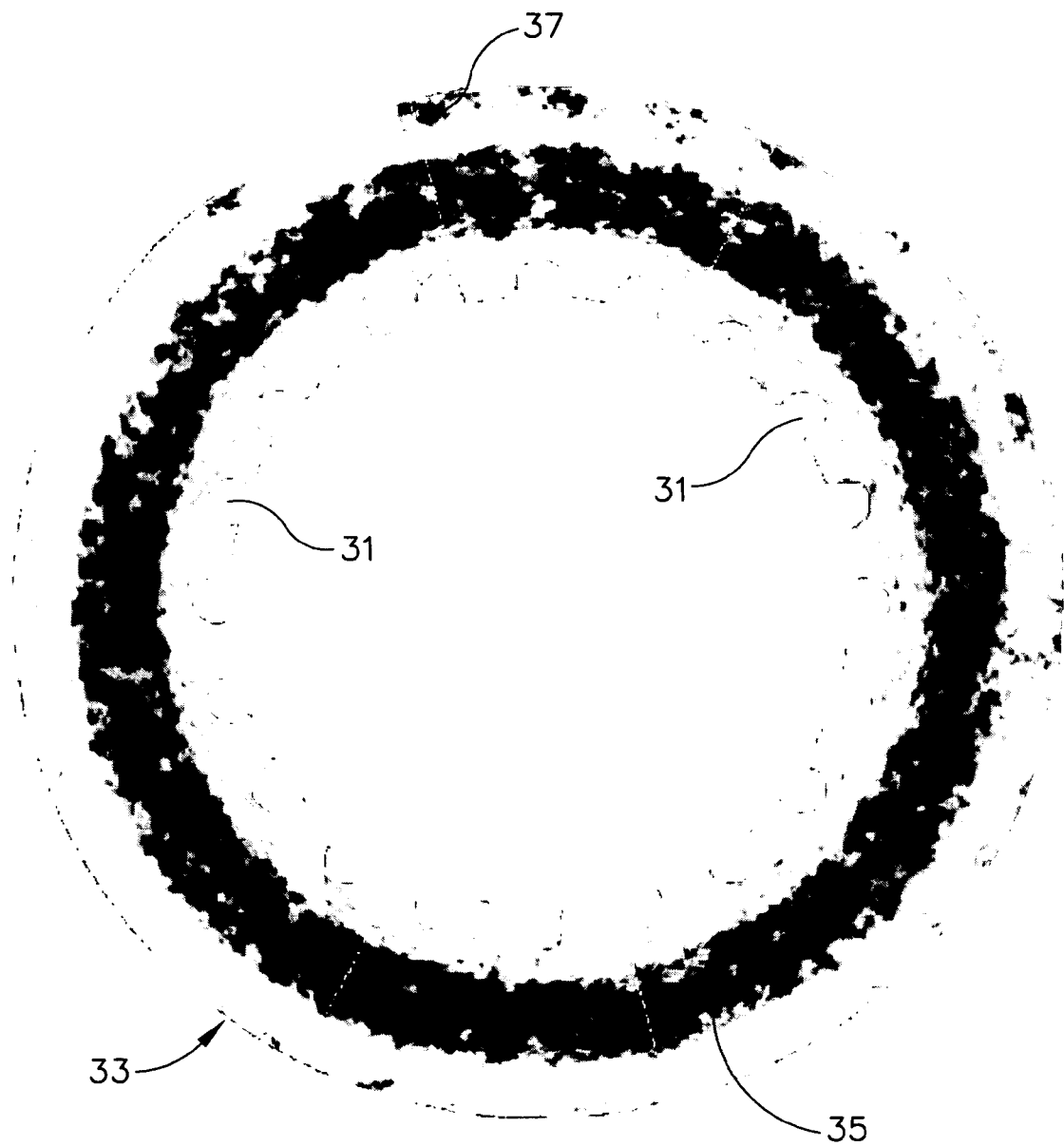
FIG. 3 presents a CT scan top plan image of an aircraft landing system brake disc made in accordance with the present invention.

FIG. 3 presents a portion of an X-ray Computed Tomograph scan (a CT scan). CT technology is similar to the CAT technology used in the medical field. The CT scan procedure is a non-destructive technique for visualizing characteristics of the interior of a solid body. In this case, a CT scan was taken of a carbon composite brake disc 33 made in accordance with the present invention. The circular cut-outs 31 along the interior edge of the annular brake disc are machined therein after the disc is manufactured in order to permit the insertion of metal inserts to connect the brake disc to other portions of the braking assembly. The CT scan shows density readings in the interior of the carbon-carbon composite brake disc. Dark annular ring 35 in the interior of the disc indicates a region having a density lower than 1.600 grams per cubic centimeter. The CT scan in FIG. 3 shows that there is no major delamination in the disc. The dark circular region (reference numeral 35) at the interior of the disc does not extend either to the inside edge or to the outside edge of the disc. In this embodiment of the invention, the disc was molded with insulation installed on the center mold insert which makes contact with the inside diameter of the disc. The inside edge shows no dark regions at all, while the outside edge shows only a few small isolated dark regions 37 having densities lower than 1.600 g/cc. Thus volatiles were efficiently vented during the manufacture of disc 33. Volatiles were not trapped inside the structure of the disc to leave voids in the finished goods.

Figure 4A:
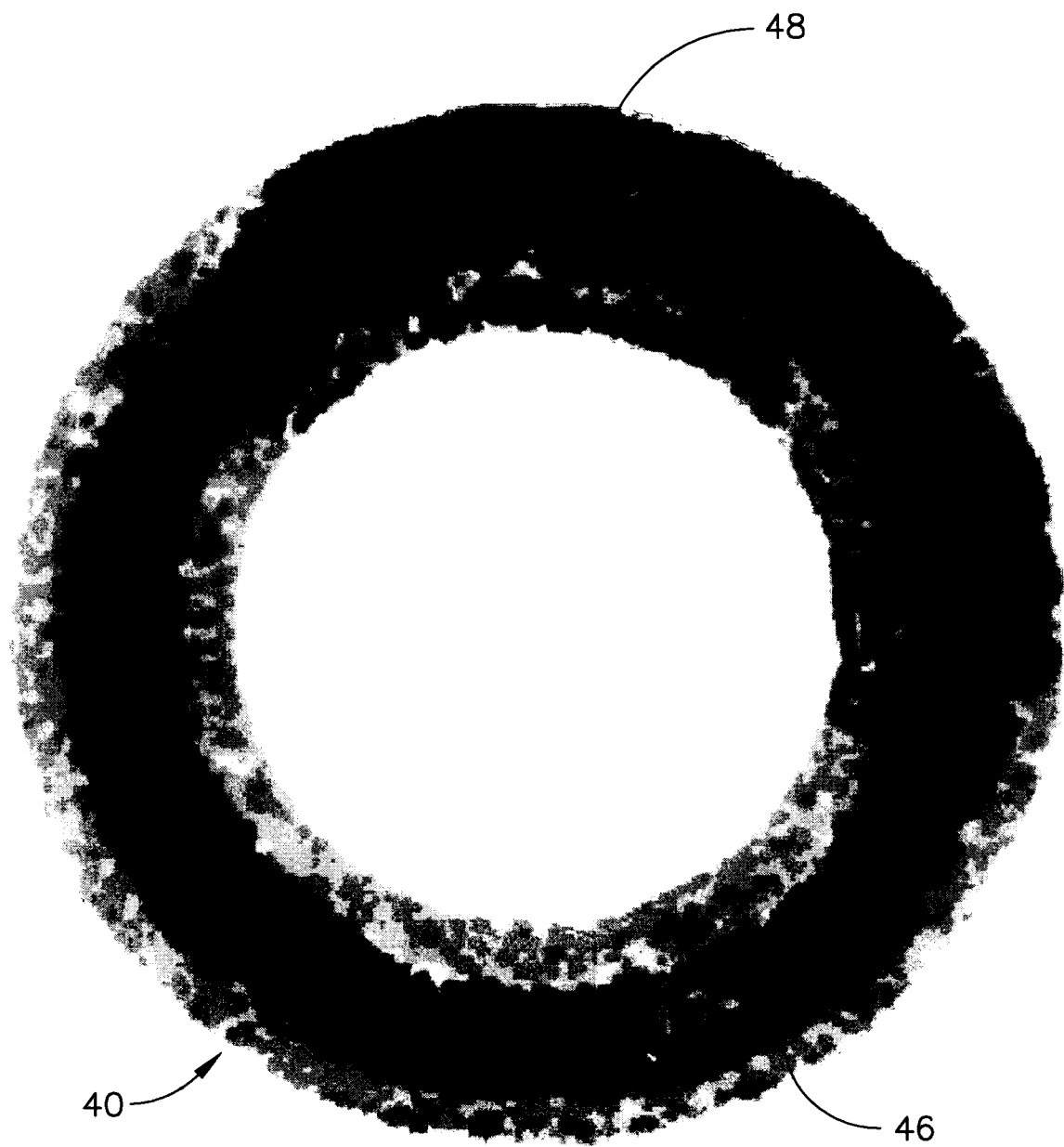
FIG. 4A shows the results of an ultrasonic scan of a brake disc which was not made in accordance with the present invention.
Figure 4B:
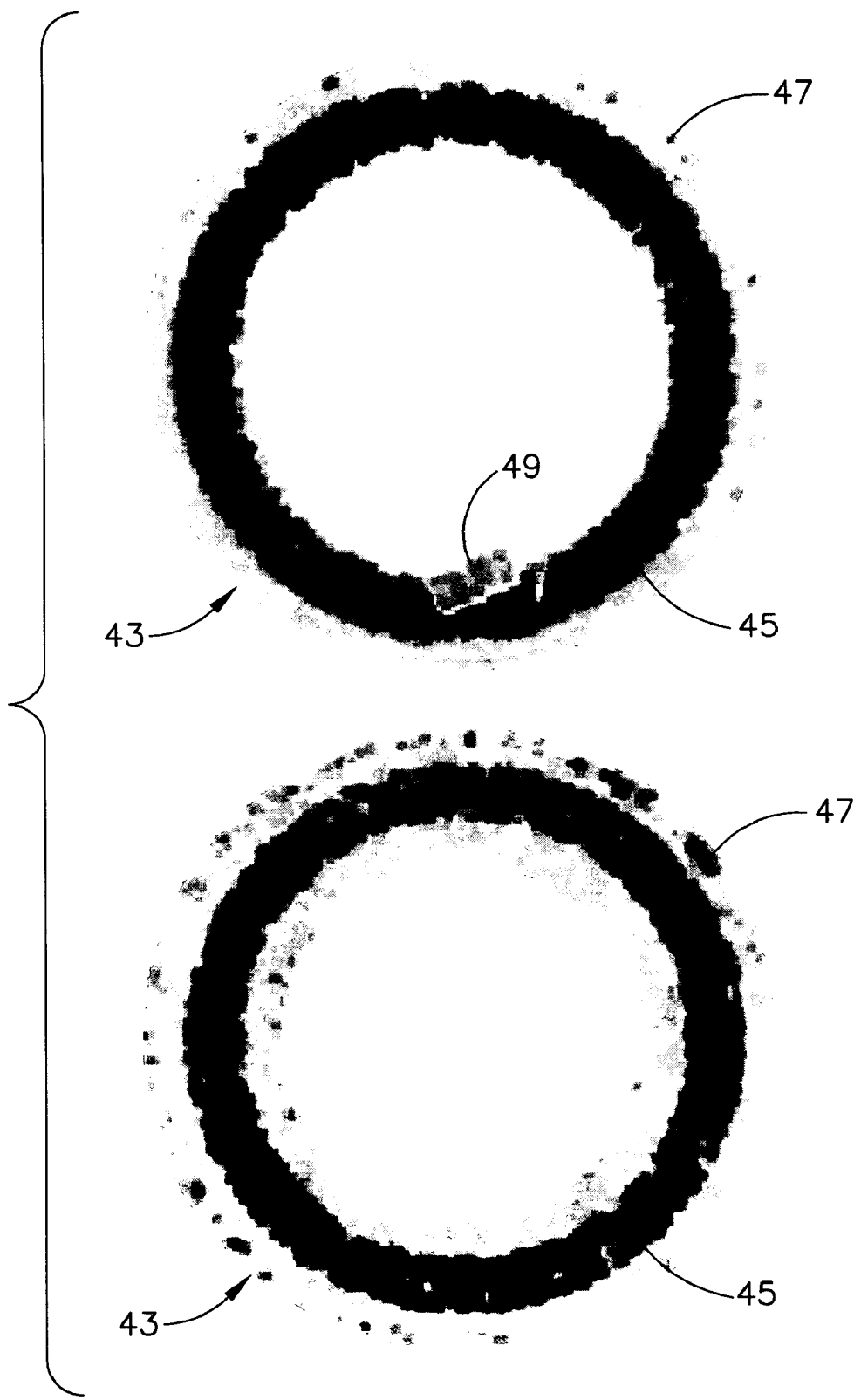
FIG. 4B shows the results of an ultrasonic scan of a brake disc which was made in accordance with the present invention.

FIGS. 4A and 4B show images derived from ultrasonic pulse/echo inspection scans. The contrast shown in the images results from the amplitude or returned ultrasonic echo. In the case of a crack, an isolated void, or delamination, the returned signal is strong and shows as a dense, dark color. In this case, ultrasonic scans were taken of carbon composite discs. FIG. 4A shows the results of an ultrasonic scan of a carbon composite disc 40 which was not made in accordance with the present invention. Dark annular ring 46 in the interior of disc 40 is a low density region. In some areas of the disc, dark annular ring 46 blends into extensive low density region 48 at the outside edge of disc 40. This extensive low density region is caused by delamination in the fibrous matrix within disc 40. FIG. 4B, in contrast, shows the results of an ultrasonic scan of a carbon composite disc 43 which was made in accordance with the present invention. In FIG. 4B, the top of the disc is shown at the top of the drawing and the bottom of the disc is shown at the bottom of the drawing. Reference numeral 49 identifies a label that was present on the top surface of the disc. The ultrasonic scan in FIG. 4B shows that there is no major delamination in disc 43. The annular dark region 45 at the interior of the disc does not extend either to the inside edge or to the outside edge of the disc. In this embodiment of the invention, the disc was molded with insulation installed on the center mold insert which makes contact with the inside diameter of the disc. The inside edge of the disc shows no dark regions at all, but the outside edge shows only a few small isolated low density dark regions 47. This is evidence that volatiles were efficiently vented through the inside diameter of the disc during the manufacture of disc 43. Volatiles were not trapped inside the structure of the disc to leave voids in or to allow delamination of the finished goods.

What is claimed is:

1. A process comprising:
   locating a mold billet in the form of an annular carbon fiber-reinforced phenolic matrix composite disc within an annular mold cavity including an inner diameter and an outer diameter, wherein a portion of the annular mold cavity is defined by a steel insert, and wherein a layer of calcium carbonate-filled fiberglass-reinforced plastic material that has a thermal conductivity of 1-2 BTU/hour/square foot/inch/F.° at 450° F. is positioned between the steel insert and a heat source configured to heat the mold billet in the mold cavity; and
   applying heat via the heat source and pressure to the mold cavity, wherein the layer of calcium carbonate-filled fiberglass-reinforced plastic material is positioned relative to the mold cavity such that heat transfer from the heat source into the mold billet through a bottom surface of the mold cavity is greater than heat transfer from the heat source into the steel insert.

2. The process of claim 1, wherein the temperature of the insert during the process is approximately 5° C. lower than the temperature that it would reach in an otherwise identical process in which the layer of calcium carbonate-filled fiberglass-reinforced plastic material was not located between the heat source and the insert.

3. The process of claim 1, wherein the annular carbon fiber-reinforced phenolic matrix composite disc comprises an aircraft landing system brake disc.

4. The process of claim 1, wherein the layer of calcium carbonate-filled fiberglass-reinforced plastic material is configured such that portions of the mold billet adjacent at least one of inner diameter or the outer diameter of the annular mold cavity are prevented from being subjected to accelerated heating and curing relative to portions of the mold billet adjacent to the bottom of the mold cavity to permit volatile materials generated within the annular carbon fiber-reinforced phenolic matrix composite disc by application of heat and pressure thereto to escape through portions of the mold billet adjacent the at least one of the inner diameter or the outer diameter of the annular disc defined during a breath cycle of the process.

* * * * *